United States Patent
Chouai et al.

(10) Patent No.: US 8,192,603 B2
(45) Date of Patent: Jun. 5, 2012

(54) ELECTROCOAT COMPOSITION AND PROCESS REPLACING PHOSPHATE PRETREATMENT

(75) Inventors: Abdellatif Chouai, Lake Jackson, TX (US); Timothy S December, Rochester Hills, MI (US)

(73) Assignee: BASF Coatings GmbH, Münster (DE)

( * ) Notice: Subject to any disclaimer, the term of this patent is extended or adjusted under 35 U.S.C. 154(b) by 630 days.

(21) Appl. No.: 12/345,277

(22) Filed: Dec. 29, 2008

(65) Prior Publication Data

US 2010/0167072 A1 Jul. 1, 2010

(51) Int. Cl.
C25D 13/06 (2006.01)
C25D 13/12 (2006.01)

(52) U.S. Cl. ......... 204/488; 204/502; 204/510; 524/612

(58) Field of Classification Search ................ 524/413, 524/432, 408, 431, 406, 469, 612; 204/488, 204/506, 510
See application file for complete search history.

(56) References Cited

U.S. PATENT DOCUMENTS

| | | |
|---|---|---|
| 2,723,971 A | 11/1955 | Cupery |
| 3,400,102 A | 9/1968 | Ludington |
| 3,564,074 A | 2/1971 | Avallone |
| 4,164,487 A | 8/1979 | Martin |
| 4,289,812 A | 9/1981 | Martin |
| 4,397,970 A | 8/1983 | Campbell et al. |
| 4,425,451 A | 1/1984 | Sekmakas et al. |
| 4,439,593 A | 3/1984 | Kelso et al. |
| 4,461,857 A | 7/1984 | Sekmakas et al. |
| 4,487,859 A | 12/1984 | Martino |
| 4,508,765 A | 4/1985 | Ring et al. |
| 4,600,754 A | 7/1986 | Winner |
| 4,692,484 A | 9/1987 | Roberts |
| 4,734,467 A | 3/1988 | Yamada et al. |
| 4,761,337 A | 8/1988 | Guagliardo et al. |
| 4,968,730 A | 11/1990 | Hönig et al. |
| 4,968,775 A | 11/1990 | Toman et al. |
| 4,992,516 A | 2/1991 | Schipfer et al. |
| 4,992,525 A | 2/1991 | Kriessmann et al. |
| 5,039,721 A | 8/1991 | Schwerzel et al. |
| 5,086,156 A | 2/1992 | McGrath et al. |
| 5,095,050 A | 3/1992 | Treybig et al. |
| 5,130,350 A | 7/1992 | Schwerzel et al. |
| 5,132,378 A | 7/1992 | Schipfer et al. |
| 5,141,815 A | 8/1992 | Rickett |
| 5,264,469 A | 11/1993 | Mysliwczyk et al. |
| 5,342,901 A | 8/1994 | Kogure et al. |
| 5,380,816 A | 1/1995 | Sullivan |
| 5,389,704 A | 2/1995 | Yabu |
| 5,554,700 A | 9/1996 | Schipfer et al. |
| 5,556,913 A | 9/1996 | Tobinaga et al. |
| 5,635,049 A | 6/1997 | Mysliwczyk et al. |
| 5,670,441 A | 9/1997 | Foedde et al. |
| 5,726,249 A | 3/1998 | Barsotti et al. |
| 5,817,733 A | 10/1998 | Rink |
| 5,859,095 A | 1/1999 | Moyle et al. |
| 5,866,259 A | 2/1999 | Harris et al. |
| 5,908,912 A | 6/1999 | Kollah et al. |
| 5,972,189 A | 10/1999 | McMurdie et al. |
| 5,975,874 A | 11/1999 | Daly et al. |
| 6,025,438 A | 2/2000 | Hinterwaldner et al. |
| 6,110,341 A | 8/2000 | McMurdie et al. |
| 6,174,422 B1 | 1/2001 | Honig et al. |
| 6,265,079 B1 | 7/2001 | Hishiguchi et al. |
| 6,333,367 B1 | 12/2001 | Kato et al. |
| 6,353,057 B1 | 3/2002 | He et al. |
| 6,436,201 B1 | 8/2002 | Sugita et al. |
| 6,492,027 B2 | 12/2002 | Nishiguchi et al. |
| 6,617,030 B2 | 9/2003 | Morishita et al. |

(Continued)

FOREIGN PATENT DOCUMENTS

DE 2918610 A1 11/1980

(Continued)

OTHER PUBLICATIONS

International Search Report and Written Opinion for co-pending Application No. PCT/US2009/068156 mailed Jun. 24, 2010.

(Continued)

*Primary Examiner* — Kishor Mayekar
(74) *Attorney, Agent, or Firm* — Harness, Dickey & Pierce, P.L.C.

(57) ABSTRACT

An aqueous coating composition comprises a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements and combinations thereof and an electrodepositable binder, the binder comprising (a) a phosphorous-containing group

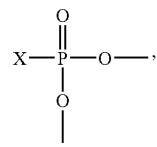

in which X is a hydrogen, a monovalent hydrocarbon, an alkyl group such as an aminoalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the resin, with the caveat that at least one oxygen atom has a covalent bond to resin; (b) a carboxylate group separated by from 2 to 4 carbons from an ester group; and (c) a tridentate amine ligand. The coating composition can be electrodeposited on a metal substrate to provide superior corrosion resistance.

29 Claims, No Drawings

U.S. PATENT DOCUMENTS

| | | | |
|---|---|---|---|
| 6,624,215 B1 | 9/2003 | Hiraki et al. | |
| 6,852,824 B2 | 2/2005 | Schwarte et al. | |
| 6,887,526 B1 | 5/2005 | Arlt et al. | |
| 6,897,265 B2 | 5/2005 | Algrim et al. | |
| 6,994,888 B2 | 2/2006 | Metcalfe | |
| 7,008,998 B2 * | 3/2006 | Tazzia et al. | 524/800 |
| 7,081,157 B2 | 7/2006 | Maze et al. | |
| 7,087,146 B2 | 8/2006 | Grosse-Brinkhaus et al. | |
| 7,300,963 B2 | 11/2007 | Birnbrich et al. | |
| 7,345,101 B2 | 3/2008 | Pawlik et al. | |
| 2003/0004231 A1 | 1/2003 | Ehmann et al. | |
| 2004/0071972 A1 | 4/2004 | Nakajima et al. | |
| 2005/0065243 A1 | 3/2005 | Feola et al. | |
| 2005/0256260 A1 | 11/2005 | Ohrbom et al. | |
| 2006/0025497 A1 | 2/2006 | Ushirogouchi et al. | |
| 2006/0058423 A1 | 3/2006 | Gros et al. | |
| 2006/0127678 A1 | 6/2006 | Pawlik et al. | |
| 2006/0261311 A1 | 11/2006 | Poulet et al. | |
| 2007/0149655 A1 | 6/2007 | Kawaraya et al. | |
| 2007/0244270 A1 | 10/2007 | December et al. | |
| 2007/0275256 A1 | 11/2007 | Ragunathan et al. | |
| 2008/0102214 A1 | 5/2008 | December et al. | |
| 2008/0103268 A1 | 5/2008 | December et al. | |
| 2008/0103269 A1 | 5/2008 | December et al. | |
| 2008/0193664 A1 | 8/2008 | Gonzalez et al. | |
| 2008/0194783 A1 | 8/2008 | Gonzalez et al. | |
| 2008/0194843 A1 | 8/2008 | Gonzalez et al. | |

FOREIGN PATENT DOCUMENTS

| | | |
|---|---|---|
| DE | 4408865 A1 | 9/1995 |
| EP | 0230292 | 7/1987 |
| EP | 0288942 | 11/1988 |
| EP | 0304834 A2 | 3/1989 |
| EP | 0680988 A2 | 11/1995 |
| JP | 56062830 | 5/1981 |
| JP | 4091170 | 3/1992 |
| JP | 0269367 | 3/2002 |
| JP | 2002201410 | 7/2002 |
| JP | 2003129005 | 5/2003 |
| JP | 2003226982 | 8/2003 |
| KE | 58125760 | 7/1983 |
| WO | WO 96/00755 | 1/1996 |
| WO | WO 00/47642 | 8/2000 |
| WO | WO 01/42253 | 6/2001 |
| WO | WO 01/44382 | 6/2001 |
| WO | WO 2007/117900 A2 | 10/2007 |
| WO | WO 2008/127744 | 10/2008 |

OTHER PUBLICATIONS

International Search Report and Written Opinion for co-pending Application No. PCT/US2009/068162 mailed Mar. 4, 2010.

International Search Report and Written Opinion for co-pending Application No. PCT/US2009/050120 mailed Aug. 27, 2010.

International Search Report and Written Opinion for co-pending Application No. PCT/US2009/048640 mailed Oct. 1, 2009.

Database WPI Week 198335, Thomson Scientific, London, 1983-750925; dated Jul. 26, 1983.

Kaliyappan, T. et al., "Co-ordination polymers," Progress in Polymer Science, 25 (2000) 343-370.

Kaliyappan, T. et al., "Synthesis and characterization of a new metal chelating polymer and derived Ni (II) and Cu (II) polymer complexes," Polymer, Elsevier Science Publishers, B.V., GB, vol. 37, No. 13, pp. 2865-2869, 1996.

Singh A. et al., "Towards achieving selectivity in metal ion binding by fixing ligand-chelator complex geometry in polymers," Reactive & Functional Polymers, 44 (2000) 79-89.

Tang et al., "The coiled coils in the design of protein-based constructs: hybrid hydrogels and epitope displays," Journal of Controlled Release 72 (2201) 57-50.

Yang, Li Qun et al., "Studies on Coordination-Crosslinking of Soap-Free Polyacrylate Hydrosol and Metal Ion," J. Appl. Polym. Sci., Dec. 26, 1997, John Wiley & Sons Inc., New York, NY vol. 66, No. 13, pp. 2457-2463, XP002474955.

\* cited by examiner

ELECTROCOAT COMPOSITION AND PROCESS REPLACING PHOSPHATE PRETREATMENT

FIELD OF THE DISCLOSURE

The invention relates to coatings for metal substrates, particularly electrocoat coating compositions, methods of preparing them, methods of coating metal substrates, particularly electrodeposition of coatings onto a conductive substrate, and coated metal substrates.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming epoxy resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness. The phosphate pre-treatment, however, has up to now been an indispensable step in protecting against corrosion for automotive vehicle bodies.

McMurdie et al., U.S. Pat. No. 6,110,341 teaches that hydrocarbyl phosphate and phosphonic acid esters, which may include polyepoxide linking groups, can be incorporated into electrodeposition baths in amounts of up to 500 ppm on total bath weight for improved corrosion protection. Examples including phenylphosphonic acid were reported to have a modest increase in corrosion protection over untreated steel panels. December et al., U.S. Patent Application Publication No. 2008/0102214, 2008/0103268, and 2008/0103269 disclose that coating adhesion to a coated metal substrate can be improved by including in a film-forming component (e.g., crosslinkable resin or crosslinker) nonionic metal coordinating structure. U.S. Patent Application Publication No. 2007/0244270 disclose a polymeric ligand prepared by reacting hydroxyl-functional resin or crosslinker with a cyclic anhydride incorporated in a coating to complex a metal catalyst to more easily and effectively incorporate the metal catalyst. Improved cure response, chip resistance, and corrosion inhibition are reported. Certain patent documents describe electrocoat coating compositions containing epoxy resins prepared using diethylenetriamine, examples of which are Grosse-Brinkhaus et al., U.S. Pat. No. 7,087,146; Nishiguchi et al., U.S. Pat. No. 6,492,027; Tobinaga et al., U.S. Pat. No. 5,556,913; and Schwerzel et al., U.S. Pat. No. 5,039,721.

A number of patents disclose using certain metal oxides in electrocoat coating compositions or other metal coatings. Among these are Gros et al., U.S. Pat. Appl. Pub. No. 2006/0058423; (manganese oxide); Poulet et al., U.S. Pat. Appl. Pub. No. 2006/0261311 yttrium, zirconium, lanthanum, cerium, praseodymium and neodymium oxides or salts); Maze et al., U.S. Pat. No. 7,081,157 ($MoO_3$); Matsuda et al., JP 2003226982 (vanadium pentoxide); Mizoguchi et al., JP2003129005 (zinc oxide); and Kawaraya et al., U.S. Pat. Appl. Pub. No. 2007/0149655 (zirconium oxide). It is not known, however, to combine these metal oxides with certain groups we have discovered to greatly enhance the ability of these metal oxides to protect the metal substrate from corrosion.

SUMMARY OF THE DISCLOSURE

We disclose a composition and process for electrodepositing an electrocoat coating on a metal substrate, which may be an unphosphated metal substrate (that is, a metal substrate that has not undergone a phosphate pretreatment), in which the electrocoat coating provides excellent corrosion protection.

The process uses an aqueous electrocoat coating composition, also called an electrocoat bath, with a binder comprising resin or resins including: (a) at least one phosphorous-containing group

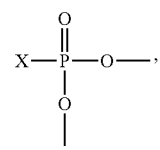

in which X is a hydrogen, a monovalent hydrocarbon group (i.e., hydrocarbyl group), an alkyl in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the cathodically electrodepositable resin, with the caveat that at least one oxygen atom has a covalent bond to the cathodically electrodepositable resin; (b) a carboxylate group separated by 2 to 4 carbons from an ester group, such as monoester of a cyclic anhydride; and (c) at least one tridentate amine ligand, wherein the composition further includes a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these. The alkyl groups of the phosphorous-containing groups may be cycloalkyl groups and may be hydrocarbyl groups or may include heteroatoms. "Tridentate amine ligand" refers to a group having one amine group bonded to the resin and two terminal tertiary amine groups; in certain embodiments, the tridentate amine ligand has a structure —N(—R'—NR$_2$)$_2$ in which R' is an alkyl group having from one up to four carbon atoms and optionally having an ether oxygen and each R is independently an alkyl of 1 to 4 carbon atoms. "Resin" is used in this disclosure to encompass resin, oligomer, and polymer. "Binder" refers to the film-forming components of the coating composition. Typically the binder is thermosetting or curable. For convenience, resin including the phosphorous-containing group will be referred to as a phosphorylated resin. The carboxylate group separated by two to four carbons from an ester group (e.g., monoester of a cyclic anhydride) may be a part of the phosphorylated resin or may be a part of a second resin, including a crosslinker resin having groups that react during cure with the phosphorylated resin. For convenience, this group may be referred to either as "the carboxylate/ester group" or as its particular embodiment of a "monoester of a cyclic anhydride." The tridentate amine ligand may likewise be part of the phosphorylated resin or may be part of a further resin. After curing of a thermosetting coating layer, the phosphorous-containing group, the tridentate amine ligand, and the monoester of a cyclic anhydride may be a part of a crosslinked binder. In such a case, each of the phosphorylated resin, the resin with the tridentate amine ligand (if different from the phosphorylated resin), and the resin bearing the carboxylate/ester group (if different from the phosphorylated resin and tridentate amine ligand resin) has at least one crosslinkable group that reacts during curing of the coating composition to become part of the cured binder.

In various embodiments, the phosphorous-containing group is a monoester of phosphoric or phosphonic acid. In other embodiments, the phosphorous-containing group is diester of phosphoric or phosphonic acid. In still other embodiments, the phosphorous-containing group is diester of phosphoric acid. In various embodiments, the phosphorylated resin has some combination of these phosphorous containing groups. The phosphorylated resin may have one or a plurality of the phosphorous-containing groups. In addition, there may be one or a plurality of the carboxylate/ester and tridentate amine ligand groups present in the binder, as a part of the phosphorylated resin, a part of a resin or resins other than the phosphorylated resin, a part of the crosslinker, or a part of more than one of these.

In one embodiment, the amine-functional phosphorylated resin comprises an amine-functional monophosphate ester or monophosphonic acid ester of a polyepoxide resin. In another embodiment, the amine-functional phosphorylated resin comprises an amine-functional diphosphate ester, triphosphate ester, or diphosphonic acid ester of a polyepoxide resin. In other embodiments, the amine-functional phosphorylated resin includes a combination of these esters. The remaining oxygens on the phosphorous atom that are not covalently bound between the resin and the phosphorous atom may also be esterified. In certain embodiments, at least one P—OH group remains unesterified; that is, the phosphorous containing group has at least one P—OH group.

In various embodiments, the phosphorylated resin has one phosphorous atom or a plurality of phosphorous atoms. The phosphorylated resin may be prepared using a polyepoxide extended by reaction with one or more extenders, with an extender having at least two active hydrogen-containing groups.

In various embodiments, the carboxylate/ester group may have a structure

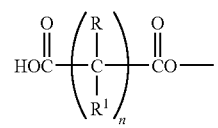

in which n is 2, 3, or 4 and each of R and R$^1$ is independently selected from H and alkyl groups having one to four carbon atoms. In certain embodiments each of R and R$^1$ is independently selected from H and hydrocarbyl groups having one to four carbon atoms.

In one embodiment, the cathodically electrodepositable resin having at least one tridentate amine ligand also has additional amine groups.

The tridentate amine ligands of the resin are nucleophilic and are available to coordinate to the metal substrate surface and to the metal oxide, enhancing corrosion resistance of the electrocoat coating. The tridentate amine ligand resin has one or more groups —N(—R'—NR$_2$)$_2$ in which R' is an alkyl group having from one up to four carbon atoms and optionally having an ether oxygen and each R is independently an alkyl of 1 to 4 carbon atoms. In certain embodiments, R' is an ethylene or propylene group and each R is a methyl group.

The resin or resins having at least one tridentate amine ligand, the carboxylate/ester group, and the phosphorous-containing group may be epoxy or vinyl resin (e.g., an acrylic resin). The tridentate amine ligand, carboxylate/ester group, and phosphorous-containing group are available to coordinate to the metal substrate surface and to the metal oxide, enhancing corrosion resistance of the electrocoat coating on the metal substrate.

In various embodiments, the binder comprises a cathodically electrodepositable, amine-functional resin, which may also have the phosphorous-containing group(s), the carboxylate/ester group(s), and the tridentate amine ligand(s). In certain embodiments, the electrocoat coating composition binder includes from about 0.01 to about 99% by weight of resin or resins comprising the phosphorous-containing group (s), the carboxylate/ester group(s), and the tridentate amine ligand(s). Among these embodiments are those in which the binder includes from about 1 to about 90% by weight or from about 5 to about 80% by weight of the resin or resins comprising the phosphorous-containing group(s), the carboxylate/ester group(s), and the tridentate amine ligand(s). In certain embodiments, the binder comprises a crosslinker. In certain embodiments, the binder comprises a further, electrodepositable resin other than the resin or resins comprising the phosphorous-containing group(s), the carboxylate/ester group(s), and the tridentate amine ligand(s). In any of these embodiments, the binder may also comprises a crosslinker which reacts during cure of the electrodeposited coating layer with the resin or resins comprising the phosphorous-containing group(s), the carboxylate/ester group(s), and/or the tridentate amine ligand(s), the further, electrodepositable resin, or any combination of these resins. In these embodiments, the electrodeposition coating composition binder may include from about 0.01 to about 30% by weight of the resin or resins comprising the phosphorous-containing group(s), the carboxylate/ester group(s), and the tridentate amine ligand(s) and from about 40 to about 80% by weight of the further, electrodepositable resin. The electrodeposition coating composition binder may in certain embodiments include from about 1 to about 30% by weight or from about 5 to about 20% by weight of the resin or resins comprising the phosphorous-containing group(s), the carboxylate/ester group(s), and the tridentate amine ligand(s) and from about 45 to about 75% by weight or from about 50 to about 70% by weight of the further, electrodepositable resin.

In certain embodiments, the electrodeposition coating composition includes from about 0.01 to about 1% by weight of the metal oxide, based on the weight of total binder solids.

A method of coating an electrically conductive substrate, such as a metal automotive vehicle body or part, comprises placing the electrically conductive substrate into the aqueous electrodeposition coating composition comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements and an electrodepositable binder comprising a resin or resins comprising the phosphorous-containing group(s), the carboxylate/ester group(s), and the tridentate amine ligand(s) and, using the electrically conductive substrate as the cathode (in the case of amine- or ammonium-functional principal resin) or the anode (in the case of acid-functional principal resin), passing a current through the aqueous electrodeposition coating composition to deposit a coating layer comprising the binder onto the electrically conductive substrate. In certain embodiments, the resin or one or more of the resins comprising the phosphorous-containing group(s), the carboxylate/ester group(s), and the tridentate amine ligand(s) is or are cathodically electrodepositable. The deposited coating layer may then be cured to a cured coating layer. Subsequent coating layers may be applied on the deposited (optionally cured) electrodeposited coating layer. For example, the electrodeposited coating layer may be a primer layer and other layers such as an optional spray-applied primer surfacer and a topcoat layer or topcoat layers (e.g., a colored basecoat layer and a clearcoat layer) may be applied over the electrodeposited coating layer.

In one embodiment of the method, the electrically conductive substrate is unphosphated before it is coated with the electrodeposited coating comprising the metal oxide and the resin or resins comprising one or more of the phosphorous-containing group(s), the carboxylate/ester group(s), and the tridentate amine ligand(s); that is, the substrate is free of a phosphate pre-treatment.

In one embodiment of the method, a metal automotive vehicle body is cleaned, and the cleaned metal automotive vehicle body is electrocoated with an aqueous coating composition comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements and a binder comprising a resin or resins comprising the phosphorous-containing group(s), the carboxylate/ester group(s), and the tridentate amine ligand(s). Thus, no phosphate pretreatment is used. The binder may be cathodically or anodically electrodepositable. The binder of the electrocoat coating composition may include a further resin that is an acid- or amine-functional resin that is electrodepositable and that does not have the phosphorous-containing group(s), the carboxylate/ester group(s), or the tridentate amine ligand(s), and generally the binder may include a crosslinker reactive with one or more of the resins so that the electrodeposited coating layer may be cured. Any or any combination of the resins or crosslinker present in the binder may have the phosphorous-containing group(s), the carboxylate/ester group(s), or the tridentate amine ligand(s).

A coated metallic substrate comprises a coating layer on the substrate, the coating layer comprising a cured coating formed from a composition comprising a binder comprising phosphorous-containing group(s), carboxylate/ester group(s), and tridentate amine ligand(s) on one resin or a combination of resins and including a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these. In various embodiments, the binder further comprises a crosslinker reactive with the resin or resins with phosphorous-containing group(s), carboxylate/ester group(s), and tridentate amine ligand(s), a further, electrodepositable resin, or any combination of these resins that reacts during cure to form the cured coating. The cured coating provides unexpectedly strong resistance to corrosion. The unexpected resistance to corrosion is thought to be due to interactions between the phosphorous-containing group(s), carboxylate/ester group(s), and tridentate amine ligand(s), the metal oxide, and the metallic substrate. While not wishing to be bound by theory, it is believed that the phosphorous-containing group(s), carboxylate/ester group(s), and tridentate amine ligand(s) interact with both the metal substrate and the metal oxide to enhance the anticorrosive effectiveness of the metal oxide.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. In this description, "amine-functional" will be used to refer to amine- or ammonium-functional resins that are cathodically electrodepositable.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal or metallic substrate, which may be unphosphated, is electrocoated with an aqueous electrocoat coating composition comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these and having binder comprising a tridentate amine ligand, a carboxyl group separated by from 2 to 4 carbons from an ester group (such as monoester of a cyclic anhydride), and a phosphorylated resin (resin with the phosphorous-containing ester group). The electrodeposited coating layer may be cured and may be overcoated with one or more additional coating layers.

The phosphorylated resin has at least one covalently bonded, phosphorous-containing group having a structure

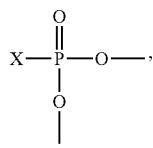

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the resin, with the caveat that at least one oxygen atom has a covalent bond to the resin. In each case, an alkyl group may be a cycloalkyl group. The phosphorylated resin may also include the carboxylate/ester group, or the carboxylate/ester group may be a part of another resin or of a crosslinker. The phosphorylated resin may also include the tridentate amine ligand, or the tridentate amine ligand may be a part of another resin or of a crosslinker.

The phosphorylated resin may be prepared using any resin or polymerizable monomer that may be esterified with the phosphorous-containing group. Electrocoat coating binders often include epoxy resins, and the phosphorylated resin may be one of these, for example an epoxy resin. The phosphorylated resin may be amine-functional so that it is cathodically electrodepositable itself or acid-functional so that it is anodically electrodepositable itself (a "principal" resin), or it may be combined with a further resin that is an amine- or acid-functional resin (in which case the further resin would be a principal resin).

Suitable examples of resins and monomers that can be reacted to produce resins that may be esterified with the phosphorous-containing group include those have epoxide or hydroxyl groups. The epoxide- or hydroxyl-functional resin or monomer is reacted with a —P(OR)$_2$=O group-containing acid or acid derivative, wherein each R is independently a hydrogen or alkyl group with at least one R being a hydrogen atom or a low alkyl group (particularly methyl, ethyl, propyl, and isopropyl) than can be transesterified, such as phosphoric acid, a mono- or diester of phosphoric acid, hypophosphoric acid, a monoester of hypophosphoric acid, alkyl- or arylphosphonic acid, a monoester of alkyl- or arylphosphonic acid, and combinations of these.

The epoxide- or hydroxyl-functional resin or monomer has at least one epoxide or hydroxyl group for reaction with the phosphorous-containing acid or acid derivative. For example, epoxy resins have epoxide and/or hydroxyl groups may be reacted with the phosphorous-containing acid or acid derivative. Suitable, nonlimiting examples of epoxy resins that may be reacted with the —P(OR)$_2$=O group-containing acid or derivative include epoxy resins with a plurality of epoxide and/or hydroxyl groups, such as diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4-hydroxyphenylene)ethane, bis(4-hydroxyphenyl)methane, 1,1-bis(4-hydroxyphenyl)isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like, including diglycidyl ethers of bisphenol A and bisphenol A-based resins having a structure

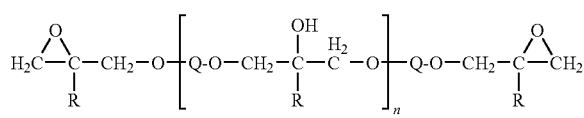

wherein Q is

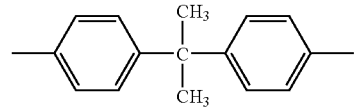

R is H, methyl, or ethyl, and n is an integer from 0 to 10. In certain embodiments, n is an integer from 1 to 5. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups.

The polyepoxide resin may be reacted with an extender to prepare a polyepoxide resin having a higher molecular weight having beta-hydroxy ester linkages. Suitable, nonlimiting examples of extenders include polycarboxylic acids, polyols, polyphenols, and amines having two or more amino hydrogens, especially dicarboxylic acids, diols, diphenols, and diamines. An extender with one or more hydroxyl groups and with three or more groups reactive with epoxy groups may be esterified with the —P(OR)$_2$=O group-containing acid or derivative to provide a product that has two groups reactive with epoxy groups and one or more phosphorous-containing groups. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxy- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl)propane-1,3-diamine, and polyoxyalkylene amines such as those available from BASF AG under the trademark POLYAMIN® or from Huntsman under the trademark JEFFAMINE®.

A monofunctional reactant may optionally be reacted with the polyepoxide resin and the extender or after reaction of the polyepoxide with the extender to prepare an epoxide-functional resin. Suitable, nonlimiting examples of monofunctional reactants include phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid. A monofunctional reactant may also have a phosphorous-containing group. For example, one hydroxyl group of a diol may be reacted with the —P(OR)$_2$=O group-containing acid or derivative to provide a monofunctional reactant having a phosphorous-containing group.

Useful catalysts for the reaction of the polyepoxide resin with the extender and optional monofunctional reactant include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide), tin and/or phosphorous complex salts (e.g., (CH$_3$)$_3$SNI, (CH$_3$)$_4$PI, triphenylphosphine, ethyltriphenyl phosphonium iodide, tetrabutyl phosphonium iodide) and so on. It is known in the art that tertiary amine catalysts may be preferred with some reactants. The reaction may be carried out at a temperature of from about 100° C. to about 350° C. (in other embodiments 160° C. to 250° C.) in solvent or neat. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The polyepoxide resin may be reacted with the phosphorous-containing acid or acid derivative before, during, or after reaction of the polyepoxide resin with the extender and optional monofunctional reactant. The reaction with the acid or acid derivative, if carried out before or after the reaction with the extender, may be carried out at a temperature of from about 50° C. to about 150° C. in solvent, including any of those already mentioned, or neat. The polyepoxide resin may also be reacted with the phosphorous-containing acid or acid derivative and optionally a monofunctional reactant such as those already described and not be reacted with an extender.

The phosphorylated resin may be an amine-functional phosphorylated resin. The amine-functional phosphorylated resin has at least one amine group, and this amine functionality may introduced before or after the phosphorylating reaction. If before, the amine functionality may be introduced by reaction of a polyepoxide resin with an extender having a tertiary amine group or with a monofunctional reactant having a tertiary amine group. Suitable, nonlimiting examples of extenders and monofunctional reactants having an amine group include diethanolamine, dipropanolamine, diisopropanolamine, dibutanolamine, diisobutanolamine, diglycolamine, methylethanolamine, dimethylaminopropylamine, and compounds having a primary amine group that has been protected by forming a ketimine, such as the ketimine of diethylenetriamine.

The epoxy resin, extended polyepoxide resin, or epoxide-functional resin is then reacted with the phosphorous-containing acid or acid derivative to make a phosphorylated resin. In certain particular embodiments, the epoxy resin, extended polyepoxide resin, or epoxide-functional resin is reacted with phosphoric acid or a source of phosphoric acid to make a phosphorylated resin. The phosphoric acid or source of phosphoric acid used in the reaction may be nonaqueous phosphoric acid, 85% in water, a more dilute aqueous phosphoric acid, pyrophosphoric acid, or polyphosphoric acid. Other suitable phosphoric acid sources are described in Campbell et al., U.S. Pat. No. 4,397,970, incorporated herein by reference. In other embodiments, the epoxy resin, extended polyepoxide resin, or epoxide-functional resin is reacted with another phosphorous-containing acid or acid derivative such as one of those mentioned above.

The phosphorylated resin may include monophosphonic acid esters, diphosphonic acid esters, monophosphate ester, diphosphate esters, and triphosphate esters, as well as combinations of these. In addition, the phosphorylated resin may have one or a plurality of the phosphorous-containing ester groups. The extent of esterification of phosphorous-containing acid or acid derivative and the number of phosphorous-containing ester groups incorporated into the resin may be controlled, inter alia, by the relative equivalents of the reactants. In one example, from about 1 to about 3 equivalents of resin (based on epoxide and hydroxyl groups) is reacted with each equivalent of phosphoric acid or phosphoric acid derivative. In another example, from about 1 to about 2 equivalents of resin (based on epoxide and hydroxyl groups) is reacted with each equivalent of phosphonic acid or phosphonic acid derivative. The equivalents of the resin reactive groups may also be in excess of the equivalents of acid or acid derivative. The resin and phosphoric or phosphonic acid or acid derivative may be mixed together and allowed to react until a desired extent of reaction is obtained. In certain embodiments, the weight per epoxide after reaction of an epoxide-functional resin is from about 180 to about 1200.

Other reactants that may be used in addition to the resin and phosphorous-containing acid or acid derivative may include alcohols such as n-butanol, isopropanol, and n-propanol; glycol ethers such as ethylene glycol monobutyl ether, propylene glycol monobutyl ether, and propylene glycol monopropyl ether; amines such as any of those mentioned above; water; and combinations of these. These reactants can also be used to react with excess oxirane groups after the reaction of the resin with the acid or acid derivative.

In a first way, an amine having at least one active hydrogen reactive with an epoxide group is included as a reactant in the reaction of the epoxide-functional resin and phosphoric acid or source of phosphoric acid. In a second way, the reaction product of the epoxide-functional epoxy resin and phosphoric acid (and any further reactants) is an epoxide-functional product that is then further reacted with an amine having at least one active hydrogen reactive with an epoxide group. Examples of suitable amine compounds include, without limitation, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines. An acid-functional resin may be prepared by reacting epoxide groups with a dicarboxylic acid, where the dicarboxylic acid is used in an equivalent excess.

In certain embodiments, a phosphorylated, epoxide-functional resin is reacted with an extender, such any of those already mentioned.

In other embodiments, the phosphorylated resin may be a vinyl resin such as an acrylic polymer. A phosphorylated vinyl or acrylic polymer may be prepared by esterifying an acrylic polymer with epoxide or hydroxyl functionality or both with a phosphorous-containing acid or esterifiable derivative, or may be prepared by polymerizing a polymerizable monomer that has the phosphorous-containing group or has been esterified with the phosphorous-containing acid or acid derivative. Reaction with a hydroxyl group produces an ester linkage, while reaction with an epoxide group produces and ester linkage with a hydroxyl group on a beta carbon. An acrylic polymer is a vinyl polymer prepared by addition polymerization of at least one acrylate or methacrylate monomer, optionally with other vinyl monomers. For convenience, "acrylic" and "vinyl" will be used interchangeably to refer to polymers of vinyl monomers (such as acrylate and methacylate monomers), as typically at least one acrylate or methacrylate monomer is copolymerized.

Suitable examples of addition polymerizable monomers that may be reacted with the phosphorous-containing acid or derivative or that can be copolymerized to provide a hydroxyl or epoxide group on the acrylic polymer for reaction with the phosphorous-containing acid or derivative include, without limitation, hydroxyethyl acrylate, hydroxyethyl methacrylate, hydroxypropyl acrylate, hydroxypropyl methacrylate, hydroxybutyl acrylate, hydroxybutyl methacrylate, allyl alcohol, glycidyl acrylate, glycidyl methacrylate, allyl glycidyl ether and combinations of these. If hydroxyl or epoxide groups are also to be used as crosslinkable functionality during cure of the coating, the amount of hydroxyl or epoxide groups incorporated will be increased over what is needed for reaction with the phosphorous-containing acid or esterifiable derivative to provide the desired amount of the hydroxyl or epoxide groups for crosslinking during cure.

The addition polymerizable monomer bearing the hydroxyl, epoxide, or phosphorous-containing group may be copolymerized with other addition polymerizable monomers in forming the acrylic polymer. Nonlimiting examples of suitable comonomers include $\alpha,\beta$-ethylenically unsaturated monocarboxylic acids containing 3 to 5 carbon atoms and ethylenically unsaturated dicarboxylic acid and anhydrides; esters, nitriles, or amides of $\alpha,\beta$-ethylenically unsaturated monocarboxylic acids containing 3 to 5 carbon atoms and ethylenically unsaturated dicarboxylic acid and anhydrides; vinyl esters, vinyl ethers, vinyl ketones, vinyl amides, and vinyl compounds of aromatics and heterocycles. Representative examples include acrylic and methacrylic acids, amides, and aminoalkyl amides; acrylonitrile and methacrylonitriles; esters of acrylic and methacrylic acid, including those of saturated aliphatic and cycloaliphatic alcohols containing 1 to 20 carbon atoms such as methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, dimethylaminoethyl, tert-butyl amino, tetrahydrofurfuryl, and isobornyl acrylates and methacrylates; the corresponding esters of maleic, fumaric, crotonic, isocrotonic, vinylacetic, and itaconic acids, and the like, such as maleic acid dimethyl ester and maleic acid monohexyl ester; and vinyl monomers such as vinyl acetate, vinyl propionate, vinyl ethyl ether, and vinyl ethyl ketone, styrene, $\alpha$-methyl styrene, vinyl toluene, 2-vinyl pyrrolidone, t-butyl styrene, and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

Acrylic polymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a vinyl copolymer.

Suitable phosphorous containing acid derivatives that may be reacted with an epoxide- or hydroxyl-functional acrylic polymer or monomer include esterifiable esters and anhydrides of phosphorous-containing acids. Among suitable examples. are those —P(OR)$_2$=O group-containing acids or acid derivatives having at least one R that is a hydrogen atom or a lower alkyl group (up to four carbon atoms, particularly methyl, ethyl, propyl, isopropyl, and tert-butyl) than can be transesterified, such as phosphoric acid, a mono- or diester of phosphoric acid, hypophosphoric acid, a monoester of hypophosphoric acid, alkyl- or arylphosphonic acid, a monoester of alkyl- or arylphosphonic acid, and combinations of these. Phosphoric acid or a source of phosphoric acid that used in the reaction may be nonaqueous phosphoric acid, 85% in water, a more dilute aqueous phosphoric acid, pyrophosphoric acid, or polyphosphoric acid. Other suitable phosphoric acid sources are described in Campbell et al., U.S. Pat. No. 4,397,970, incorporated herein by reference. The acrylic polymer has at least one epoxide or hydroxyl group for reaction with the phosphorous-containing acid or acid derivative.

The phosphorous-containing acid or acid derivative may be reacted with a polymerizable monomer before polymerization of the acrylic polymer or with the acrylic polymer during or after polymerization. The reaction with the acid or acid derivative with polymer or monomer may be carried out at a temperature of from about 50° C. to about 150° C. in solvent such as any of those already mentioned, or neat. If carried out before polymerization (that is, with an addition polymerizable, ethylenically unsaturated monomer), it is advisable to use a small amount of polymerization inhibitor (e.g., hydroquinone or methylhydroquinone) to preserve the addition polymerizable unsaturated group. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The phosphorylated acrylic polymer may include monophosphonic acid esters, diphosphonic acid esters, monophosphate ester, diphosphate esters, and triphosphate esters of the acrylic polymer, as well as combinations of these. In addition, the phosphorylated acrylic polymer may have one or a plurality of the phosphorous-containing ester groups. The extent of esterification by the phosphorous-containing acid or acid derivative and the number of phosphorous-containing ester groups incorporated into the resin may be controlled, inter alia, by the relative equivalents of the reactants. In one example, from about 1 to about 3 equivalents of vinyl or acrylic polymer (based on epoxide and/or hydroxyl groups) is reacted with each equivalent of phosphoric acid or phosphoric acid derivative. In another example, from about 1 to about 2 equivalents of acrylic polymer (based on epoxide and hydroxyl groups) is reacted with each equivalent of phosphonic acid or phosphonic acid derivative. The equivalents of the polymer reactive groups may also be in excess of the equivalents of acid or acid derivative. The polymer and phosphoric or phosphonic acid or acid derivative may be mixed together and allowed to react until a desired extent of reaction is obtained. In some embodiments, the acrylic or vinyl polymer has from about 0.01 to about 1 milliequivalents phosphorous-containing groups per gram; in some embodiments, the acrylic or vinyl polymer has from about 0.01 to about 0.1 milliequivalents phosphorous-containing groups per gram.

Other reactants that may be used in the phosphorylation reaction in addition to the acrylic polymer and phosphorous-containing acid or acid derivative may include alkyl or aromatic alcohols such as n-butanol, isopropanol, and n-propanol; glycol ethers such as ethylene glycol monobutyl ether, propylene glycol monobutyl ether, and propylene glycol monopropyl ether; alkyl or aromatic amines such as dimethylethanolamine; diethanolamine, dipropanolamine, diisopropanolamine, dibutanolamine, diisobutanolamine, diglycolamine, methylethanolamine, dimethylaminopropylamine, water; and combinations of these. These reactants can also be used to react with excess oxirane or hydroxyl groups after the reaction of the acrylic polymer with the acid or acid derivative. Similarly, such other reactants may be included when a polymerizable monomer having an epoxide or hydroxyl group is reacted with the phosphorous-containing acid or acid derivative before polymerization of the acrylic polymer.

The acrylic resins may be made anodically electrodepositable by incorporation of acid functionality, for examples by polymerization of acid-containing monomers such as acrylic acid, methacrylic acid, unsaturated dicarboxylic acids or cyclic anhydrides of these. The acrylic resins may be made cathodically electrodepositable by incorporation of amine functionality, for examples by polymerization of amino-containing monomers such as acrylamide, methacrylamide, N,N'-dimethylaminoethyl methacrylate tert-butylaminoethyl methacrylate. 2-vinylpyridine, 4-vinylpyridine, vinylpyrrolidine or other such amino monomers. Alternatively, epoxide groups may be incorporated by including an epoxide-functional monomer in the polymerization reaction and then reacted with a secondary amine. If the epoxide groups area also used to introduce the phosphorous-containing group onto the acrylic polymer, a sufficient amount of epoxide groups are incorporated for both purposes. The amine functionality may be imparted to the acrylic polymer with epoxide functionality in one of two ways. In a first way, an amine having at least one active hydrogen reactive with an epoxide group is included as a reactant in the reaction of the epoxide-functional resin and phosphorous-containing acid or source of phosphorous-containing acid. In a second way, the phosphorylated acrylic polymer is formed as an epoxide-functional product that is then further reacted with an amine having at least one active hydrogen reactive with an epoxide group. Examples of suitable amine compounds include, without limitation, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines.

The monomer bearing the hydroxyl group and the monomer bearing the group for salting (amine for a cationic group or acid or anhydride for anionic group) may be polymerized with one or more other ethylenically unsaturated monomers, such as those already mentioned.

In some embodiments, the phosphorylated resin is a polyester resin. Poly-functional acid or anhydride compounds can be reacted with polyfunctional alcohols to form the polyester, and include alkyl, alkylene, aralkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid. The phosphorous-containing group may be included by reaction of tri-functional polyol compound or polyol compound of higher functionality with the —P(OR)$_2$=O group-containing acid or acid derivative to provide lower functionality polyol having one or more phosphorous-containing groups.

Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least 2. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is typically removed from the polyester product before the coating formulation is begun. The polyester resin may be phosphorylated by reaction of a hydroxyl group with the —P(OR)$_2$=O group-containing acid or acid derivative.

In some embodiments, the phosphorylated resin can be a polyurethane resin. Polyurethanes in general can be formed from two components, where the first includes compounds containing isocyanate-reactive groups, preferably hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. Examples of suitable polyols are those mentioned in connection with extender compounds for preparing an epoxy resin or polyols for preparing a polyester resin, including those that have been provided with a phosphorous containing group.

Among useful macromonomer compounds containing isocyanate-reactive hydrogen atoms are the known polyester polyols, polyether polyols, polyhydroxy polyacrylates and polycarbonates containing hydroxyl groups. In addition to these polyhydroxy compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

The polyurethane resin may be phosphorylated by reaction of a hydroxyl group with the —P(OR)$_2$=O group-containing acid or acid derivative.

Cationic polyurethanes and polyesters may also be used. Such materials may be prepared by endcapping with, for example, an aminoalcohol or acid anhydride or, in the case of the polyurethane, a compound comprising a saltable amine group previously described in connection with making an epoxy resin or a dialkylol alkanoic acid may also be useful. Such resins may be phosphorylated by reaction of one of the phosphorous-containing acids with a hydroxyl group on the resin. Both polyurethane and polyester polymers may be made hydroxyl-functional by reaction of a stoichiometric excess of polyol monomer with the polyisocyanate or polyacid, respectively, monomers.

Polybutadiene, polyisoprene, or other epoxy-modified rubber-based polymers can be used as the phosphorylated resin in the present invention. The epoxy-rubber can be capped with a compound comprising a saltable amine group. One or more pedant epoxide or hydroxyl groups may be reacted with one of the phosphorous-containing acids to prepare a phosphorylated resin.

The binder also includes a carboxylate group separated by 2 to 4 carbons from an ester group, such as monoester of a cyclic anhydride. The carboxylate/ester group may be a part of the phosphorylated resin, the principal resin, a crosslinker resin, or still another resin. The resin may be selected from epoxy, acrylic, polyurethane, polycarbonate, polysiloxane, polyvinyl, polyether, aminoplast, and polyester resins, and can include mixtures thereof. In some embodiments, the carboxylate/ester group is bonded to the resin a linkage such as ester, amine, urethane, and ether bonds, among others. Exemplary reactions of functional groups to produce these linkages include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage. In one particular embodiment, the carboxylate/ester group is produced by reacting the resin with a cyclic anhydride. In various embodiments, the carboxylate/ester group may have a structure

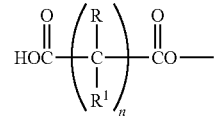

in which n is 2, 3, or 4 and each of R and R$^1$ is independently selected from H and alkyl groups having one to four carbon atoms. In certain embodiments each of R and R$^1$ is independently selected from H and hydrocarbyl groups having one to four carbon atoms.

In some embodiments, the resin with the carboxyl/ester group is an epoxy resin, acrylic polymer, polyurethane polymer or polyester polymer prepared as described above. A cyclic anhydride may be reacted with a group on the resin such as an epoxide group, hydroxyl group, thiol group, or primary or secondary amine group.

In some embodiments, the resin is an epoxy resin or acrylic polymer. These may be prepared according to the methods already described.

In some embodiments, the resin is a polyester resin. Polyfunctional acid or anhydride compounds can be reacted with polyfunctional alcohols to form the polyester, and include alkyl, alkylene, aralkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid.

Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least 2. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is typically removed from the polyester product before the coating formulation is begun.

In some embodiments, the resin can be a polyurethane resin. Polyurethanes can be formed from two components, where the first includes compounds containing isocyanate-reactive groups, preferably hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. These compounds generally have a molecular weight of from about 60 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred macromonomer compounds containing isocyanate-reactive hydrogen atoms are the known polyester polyols, polyether polyols, polyhydroxy polyacrylates and polycarbonates containing hydroxyl groups. In addition to these polyhydroxl compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

A crosslinker such as a polyisocyanate can be provided with a hydroxyl group by reaction with an aminoalcohol or, less cleanly, by reaction with a polyol such as a diol. A polyepoxide crosslinker may be reacted through one of its epoxide groups to make the carboxylate/ester group.

In certain embodiments, the resin having the carboxylate/ester group has a number average molecular weight of at least about 800, and particularly at least about 2000 daltons.

In a first embodiment, the resin having the carboxylate/ester group is prepared by reaction of a resin having a hydroxyl group with a cyclic anhydride. The anhydride, also commonly referred to as a carboxylic acid anhydride, may be either an aromatic or non-aromatic cyclic anhydride. In one embodiment, the carboxylate/ester group can be represented by a structure —OC(=O)—CR—CR'—COOH, in which R and R' are each independently an alkyl group, an alkenyl group, or a hydrogen atom or together are part of cyclic structure which may be aliphatic or aromatic. Nonlimiting examples of suitable cyclic anhydrides include dodecenylsuccinic anhydride, maleic anhydride, hexahydrophthalic anhydride, methyl-hexahydrophthalic anhydride, tetrahydrophthalic anhydride, phthalic anhydride, succinic anhydride, trimellitic anhydride, and combinations of these.

In another embodiment, the resin with carboxyl/ester group is formed from the crosslinker by reacting a hydroxy-functional carboxylic acid with the crosslinker. The hydroxy-functional carboxylic acid has one or two hydroxy groups. Examples of such hydroxy-functional carboxylic acids include, but are not limited to, lactic acid, 12-hydroxystearic acid, 2,2'-bis(hydroxymethyl)propionic acid, also referred to as dimethylolpropionic acid (DMPA), 2,2-bis(hydroxymethyl)butylic acid, and dimethylbis(hydroxymethyl)malonate. The hydroxyl-functional carboxylic acid is reacted with an isocyanate group of the crosslinker. Nonlimiting examples of isocyanate-functional materials suitable as the crosslinker include 4,4'-methylene bisdiphenyldiisocyanate (MDI), commercially available from BASF Corporation under the tradenames Lupranate® M and Lupranate® M20S. The crosslinker may first be reacted with an alcohol blocking group, e.g., by reaction with diethyleneglycolbutylether alcohol, to leave about one isocyanate group available for reaction with the hydroxyl-containing carboxylic acid so that one mole of the hydroxy-functional carboxylic acid is reacted for every one mole of the crosslinker.

The resin with the carboxyl/ester group can have more than one carboxyl/ester group. In particular embodiments, the resin may have from about 1000 to about 16,000 meq/g carboxyl/ester groups.

The tridentate amine ligand may be on the same resin as the phosphorous-containing group or the carboxylate-ester group, or both, or the tridentate amine ligand may be on a separate resin. The tridentate amine ligand-containing resin may be prepared using any resin or polymerizable monomer that includes or may be adducted with the tridentate amine ligand. Electrocoat coating binders often include epoxy or acrylic resins, and the tridentate amine ligand-containing resin may, for example, be an epoxy resin, acrylic polymer, or another resin.

The tridentate amine ligand-containing resin may be prepared by reaction of a resin having an epoxide group with a secondary amine of a triamino compound in which one amine is a secondary amine and the other two amine groups are tertiary amines. Alternatively, the tridentate amine ligand-containing resin may be prepared by reaction of a monomer having the epoxide group with the secondary amine group of the triamine compound, then polymerizing the monomer to form the tridentate amine ligand-containing resin. The resin may include a plurality of tridentate amine ligands.

Nonlimiting examples of suitable triamine compounds are those having the formula $HN(-R'-NR_2)_2$ in which R' is an alkyl group having from one up to four carbon atoms and optionally having an ether oxygen; each R is independently an alkyl of 1 to 4 carbon atoms. In certain embodiments, R' is an ethylene or propylene group and each R is a methyl group. Particular examples include, without limitation, N'-[(dimethylamino)methyl]-N,N-dimethylmethanediamine, N'-[2-(dimethylamino)ethyl]-N,N-dimethylethylenediamine, N2-[2-(diethylamino)ethyl]-N1,N1-diethyl-1,2-ethanediamine, N2-[2-(dipropylamino)ethyl]-N1,N1-dipropyl-1,2-ethanediamine, N1,N1-dibutyl-N2-[2-(dibutylamino)ethyl]-1,2-ethanediamine, 3,3'-bis-imino(N,N-dimethylpropylamine), N3-[3-(diethylamino)propyl]-N1,N1-diethyl-1,3-propanediamine, N3-[3-(dipropylamino)propyl]-N1,N1-dipropyl-1,3-propanediamine, N1,N1-dibutyl-N3-[3-(dibutylamino)propyl]-1,3-propanediamine, N'-[4-(dimethylamino)butyl]-N,N-dimethyl-1,4-butanediamine, and N4-[4-(diethylamino)butyl]-N1,N1-diethyl-1,4-butanediamine. Combinations of these may be used.

In a first embodiment, the tridentate amine ligand-containing resin is an epoxy resin. The tridentate amine ligand-containing epoxy resin may be prepared by first preparing an epoxy resin by reaction of a polyepoxide with an optional extender and/or optional other reactants such as monofunctional or tri- or higher-functional reactants, optionally including in this reaction step a monomer that provides amine functionality or reacting the product of this reaction step with the triamine that will provide the tridentate amine ligand and optionally a monomer that provides further amine functionality. In a second method, the tridentate amine ligand-containing epoxy resin may be prepared by including the triamine compound providing the tridentate amine ligand in the step of reacting the polyepoxide with an extender or by including the triamine compound providing the tridentate amine ligand in a later step after a polyepoxide-extender product is reacted with a monomer that provides further amine functionality.

Suitable, nonlimiting examples of polyepoxide resins include any of those already described in connection with preparing a phosphorous-group containing resin and a carboxyl/ester group containing resin The polyepoxide may be provided with the tridentate amine ligand by reaction of an epoxide group of a polyepoxide with three or more epoxide groups with the triamine compound so that the reaction product is left with two unreacted epoxide groups that may be reacted with extender and optional further amine-containing compounds. A monoepoxide may be provided with the tridentate amine ligand by reaction of an epoxide group of a diepoxde with the triamine compound so that the reaction product is left with one unreacted epoxide group.

The polyepoxide (and any optional monoepoxide) may be reacted with an extender to prepare a resin having a higher molecular weight having beta-hydroxy ester linkages also as described above, using such exemplary extenders and monofunctional reactants as mentioned above. The product of the reaction of polyepoxide and extender will be epoxide-functional when excess equivalents of polyepoxide are reacted or will have the functionality of the extender when excess equivalents of extender are used. The reaction may be carried out as described above. The epoxy resin may be reacted with the triamine compound providing the tridentate amine ligand during or after reaction of the polyepoxide resin with the extender and optional monofunctional reactant. The epoxy resin may be reacted with a secondary amine group the triamine compound and optionally a monofunctional reactant such as those already described and not be reacted with an extender.

As was the case with the phosphorous-group containing resin and carboxyl/ester group containing resin, the epoxy resin may be reacted with other amine compounds to introduce amine groups onto the resin during or after reaction of the polyepoxide with the extender. Additional amine functionality for a cathodically electrodepositable resin, may be introduced by reaction of the polyepoxide resin with an extender having a tertiary amine group or with a monofunctional reactant having a tertiary amine group. The amine functionality may be introduced after reaction of the polyepoxide and extender when the product is epoxide-functional by reaction of the epoxide-functional product with a reactant having a tertiary amine, suitable, nonlimiting examples of which have been mentioned above. or compounds having a primary amine group that has been protected by forming a ketimine, also as earlier mentioned. The epoxy resin with its amine functionality may be cathodically electrodeposited. The epoxy resin having an tridentate amine ligand may also be combined in the electrocoat coating composition binder with a second resin that is electrodepositable.

In a first particular embodiment, bisphenol A, the diglycidyl ether of bisphenol A, and phenol are reacted in a first step to form a epoxide functional extended resin; in a second step, the epoxide functional extended resin is reacted with diethanolamine, dimethylaminopropylamine, and 3,3'-bis-imino(N,N-dimethylpropylamine), to form an amine-functional, tridentate amine ligand-containing epoxy resin. This resin is combined with desired other components and the amine functionality is at least partially neutralized with an acid, then dispersed in an aqueous medium.

In a second embodiment, the tridentate amine ligand-containing resin is a vinyl polymer, such as an acrylic polymer. The tridentate amine ligand-containing acrylic polymer may be prepared by polymerization of a comonomer having a tridentate amine ligand or by reaction of an acrylic polymer having an epoxide group with a secondary amine of the triamine compound. Nonlimiting examples of monomers that may be reacted with the triamine before polymerization or that may be polymerized to provide an epoxide group to be reacted with the triamine compound after polymerization include addition polymerizable monomers having epoxide groups such as glycidyl acrylate, glycidyl methacryale, and allyl glycidyl ether.

Vinyl or acrylic resins may also incorporate other amine-containing monomers, such as those earlier mentioned, or, alternatively, epoxide groups may be incorporated by including an epoxide-functional monomer in the polymerization reaction, then be made cathodically electrodepositable by reaction of the epoxide groups with amines as previously described for the epoxy resins. Also as earlier described, a monomer that will provide functionality for crosslinking is generally copolymerized in forming the vinyl or acrylic polymer, suitable examples of which are set out above.

The monomer bearing the tridentate amine ligand or epoxide group that will be reacted with the triamine compound to provide the tridentate amine ligand and any optional monomer bearing another amine group and/or monomer bearing a group for crosslinking the coating may be polymerized with one or more other ethylenically unsaturated monomers, illustrative examples including any or any combination of those mentioned above in connection with the vinyl or acrylic phosphorous group- or carboxyl/ester group-containing resins.

In certain embodiments, the resin includes at least about 2% by weight and in other embodiments at least about 4% by weight phosphate groups. In certain embodiments, the resin includes up to about 15% by weight and in other embodiments up to about 12% by weight phosphate groups. In certain embodiments, the phosphate groups and tridentate amine ligand groups may be present in amounts of molar ratios of from 10:1 to 1:1 to 1:10. In some embodiments, the carboxyl/ester groups may be present in amounts of molar ratios up to 1:1 relative to the catalyst.

A binder comprising the resin or resins containing the phosphorous-containing group(s), the carboxyl/ester group(s), and the tridentate amine ligand(s) is used to prepare an electrocoat coating composition (also known as an electrocoat bath) the bath further including a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements and combinations of these. In general, a binder is prepared comprising the resin or resins, then the binder is dispersed in an aqueous medium by salting ionizable amine groups present in the binder. The metal oxide may be predispersed in the binder before or after the resin is salted and water is added, or the metal oxide may be incorporated into the electrocoat coating composition using another dispersing resin, as described in more detail below. A further, electrodepositable resin may be included in the binder. Generally, it is desirable to crosslink the electrodeposited coating to a cured coating layer, and a crosslinker (also called curing agent or crosslinking agent) is generally included in the binder for this purpose. The crosslinker may react under curing conditions with one or more resins included in the coating composition binder.

The electrodeposition coating composition includes at least one resin that is electrodepositable, i.e., at least one principal resin. If no resin having the phosphorous-containing group(s), the carboxylate group(s) separated by 2 to 4 carbons from an ester group(s), or the tridentate amine ligand(s) is sufficiently electrodepositable for good coating layer deposition, then the binder further includes an electrodepositable resin. A variety of such resins are known, including without limitation, epoxy, acrylic, polyester, polyurethane, and polybutadiene resins similar to those already mentioned that have basic or acidic groups. For cathodic electrodeposition coating, the resin has salted basic groups (e.g., primary, secondary, or tertiary amine groups) or quaternary groups (e.g., ammonium, sulfonium, or phosphonium groups); for anodic electrodeposition coating, the resin has base-salted acid groups. In one embodiment, the binder includes from about 40 to about 80 percent by weight of electrodepositable resin or resins. In another embodiment, the binder includes from about 45 to about 85 percent by weight of electrodepositable resin or resins.

Examples of suitable further, electrodepositable resins include epoxy resins, polyesters, polyurethanes, vinyl resins such as polyacrylate resins, and polybutadiene resins, prepared generally as described above including basic or acidic groups but omitting the phosphorous-containing, carboxylate/ester, and tridentate amine groups. The amine or acid equivalent weight of the principal resin can range from about 150 to about 5000, and preferably from about 500 to about 2000. The hydroxyl equivalent weight of the resins is generally between about 150 and about 2000, and preferably about 200 to about 800.

In certain embodiments, the binder in the electrodeposition coating composition may comprise from about 0.01 to about 99% by weight of the resin or resins comprising the phosphorous-containing group, the carboxylate group separated by 2 to 4 carbons from an ester group, or the tridentate amine ligand. In certain embodiments, the binder in the electrodeposition coating composition may comprise from about 0.01 to about 99% by weight, from about 1 to about 90% by weight, or from about 5 to about 80% by weight of the resin or resins comprising the phosphorous-containing group, the carboxylate group separated by 2 to 4 carbons from an ester group, or the tridentate amine ligand.

The coating composition is generally thermosetting and may include a crosslinker that reacts with the resin or resins of the binder during curing of a coating layer formed on a substrate. A crosslinker is selected according to groups available on the resin or resins of the binder for crosslinking during curing of a coating layer formed on a substrate. The art describes many considerations in selecting crosslinkers. Crosslinkers that reactive with active hydrogen groups on the resin or resin(s) are most commonly used, and of these polyisocyanates (particularly blocked polyisocyanates) and aminoplasts may be mentioned in particular. Examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyanates also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

As understood by those skilled in the art, an aminoplast resin is formed by the reaction product of formaldehyde and amine where the preferred amine is a urea or a melamine. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used. Nonlimiting examples of suitable aminoplast resins include monomeric or polymeric melamine-formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

Optionally, plasticizer or solvents or both can be added to the binder mixture or electrocoat coating composition. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

In making a cathodic electrocoat coating composition, nonlimiting examples of suitable acids include phosphoric acid, phosphonic acid, propionic acid, formic acid, acetic acid, lactic acid, or citric acid. The salting acid may be blended with the binder, mixed with the water, or both, before the binder is added to the water. The acid is used in an amount sufficient to neutralize enough of the amine groups to impart water-dispersibility to the binder. The amine groups may be fully neutralized; however, partial neutralization is usually sufficient to impart the required water-dispersibility. Similarly, in making an anodic electrocoat coating composition, nonlimiting examples of carboxyl groups of the principal resin are neutralized with a suitable base including a Lewis or Brönstead base such as amines and hydroxide compounds such as potassium hydroxide and sodium hydroxide. Illustrative amines include N,N-dimethylethylamine (DMEA), N,N-diethylmethylamine, triethylamine, triethanolamine, triisopropylamine, dimethylethanolamine, diethylethanolamine, diisopropylethanolamine, dibuthylethanolamine, methyldiethanolamine, dimethylisopropanolamine, methyldiisopropanolamine, dimethylethanolamine, and the like. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of amine-functional resin, and other such factors and can readily be determined by one of ordinary skill in the art through straightforward experimentation.

The binder emulsion is then used in preparing an electrocoat coating composition (or bath). The electrocoat bath may contain no pigment so as to produce a colorless or clear electrodeposited coating layer, but the electrocoat bath usually includes one or more pigments, generally added as part of a pigment paste, and may contain any further desired materials such as coalescing aids, antifoaming aids, and other additives that may be added before or after emulsifying the binder. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silica, calcium carbonate, talc, barytes, ferric ammonium ferrocyanide (Prussian blue), ultramarine, lead chromate, lead molybdate, aluminum silicate, precipitated barium sulfate, aluminum phosphomolybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. The pigments may be dispersed using a grind resin or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyl tin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate. The substrate may be, as some nonlimiting examples, cold-rolled steel, galvanized (zinc coated) steel, electrogalvanized steel, stainless steel, pickled steel, GALVANNEAL® GALVALUMEL®, and GALVAN® zinc-aluminum alloys coated upon steel, and combinations of these. Nonlimiting examples of useful non-ferrous metals include aluminum, zinc, magnesium and alloys of these. The electrodeposition of the coating preparations according to the invention may be carried out by known processes. The electrodeposition coating composition may be applied preferably to a dry film thickness of 10 to 35 µm. In one embodiment of the method, the electrically conductive substrate is unphosphated; that is, it is free of a phosphate pre-treatment The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes, before applying an additional coating layer over the electrodeposited coating layer.

An automotive vehicle body may be electrocoated. The automotive vehicle body is cleaned, and the cleaned metal automotive vehicle body is electrocoated with an aqueous electrodeposition coating composition comprising the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl groups and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A: Preparation of the Phosphorylated Epoxy Resin

A reactor equipped with an agitator and reflux condenser is charged with 25.85 parts by weight of normal butanol, 10.20 parts by weight of ethylene glycol monobutyl ether, and 55.62 parts by weight of the diglycidyl ether of Bisphenol A. The reactor contents are stirred for about 15 minutes followed by addition of 4.261 parts by weight of phosphoric acid (75% aqueous) and 1.77 parts by weight normal butanol. The resulting mixture is stirred at room temperature for an additional 15 minutes then heated to 102.2° F. (49° C.). The heat is turned off and the mixture is allowed to exotherm, recorded as 260.6° F. (127° C.). The reaction mixture is cooled to 220-250° F. (104.4-121.1° C.) and held for 2 hours, at which time the weight per epoxide of the product is 20,000 or greater. Deionized water is added in a first portion of 0.899 parts by weight, and the reaction mixture is maintained at 220-250° F. (104.4-121.1° C.) for one hour. A second portion of deionized water, 0.70 parts by weight, is then added to the reaction mixture. Again the reaction mixture is maintained at 220-250° F. (104.4-121.1° C.) for one hour. A final portion of deionized water, 0.70 parts by weight, is then added to the reaction mixture. Again the reaction mixture is maintained at 220-250° F. (104.4-121.1° C.) for one hour. The resulting mixture has an acid number of 29-32 mg KOH/g. The mixture is then diluted with normal butanol to 72% nonvolatile by weight.

Preparation B: Preparation of the Phosphorylated Epoxy Resin Carboxylated with Dodecenylsuccinic Anhydride (DDSA)

A reactor equipped with an agitator and reflux condenser is charged with 25.85 parts by weight of normal butanol, 10.20 parts by weight of ethylene glycol monobutyl ether, and 55.62 parts by weight of the diglycidyl ether of Bisphenol A. The reactor contents are stirred for about 15 minutes followed by addition of 4.261 parts by weight of phosphoric acid (75% aqueous) and 1.77 parts by weight normal butanol. The resulting mixture is stirred at room temperature for an additional 15 minutes then heated to 102.2° F. (49° C.). The heat is turned off and the mixture is allowed to exotherm, recorded as 260.6° F. (127° C.). The reaction mixture is cooled to 220-250° F. (104.4-121.1° C.) and held for 2 hours at which time the weight per epoxide of the product is 20,000 or greater. Deionized water is added in a first portion of 0.899 parts by weight, and the reaction mixture is maintained at 220-250° F. (104.4-121.1° C.) for one hour. A second portion of deionized water, 0.70 parts by weight, is then added to the reaction mixture. Again the reaction mixture is maintained at 220-250° F. (104.4-121.1° C.) for one hour. A final portion of deionized water, 0.70 parts by weight, is then added to the reaction mixture. Again the reaction mixture is maintained at 220-250° F. (104.4-121.1° C.) for one hour. At this stage, the product has an acid number of 29-32 mg KOH/g. A portion of 1.63 parts by weight of dodecenylsuccinic anhydride (DDSA) is introduced at 220° F. (104.4° C.) and the mixture is subsequently heated to 266° F. (130° C.). The mixture was allowed to stir for 2.5 hours. The resulting mixture has an acid number of 35-36 mg KOH/g. The mixture is then diluted with normal butanol to 72% nonvolatile by weight.

Preparation C: Preparation of Binder Emulsion with DDSA and Phosphorylated Epoxy Resin The following materials are combined in a 3-L flask with an associated heating mantle: diglycidyl ether of bisphenol A (DGEBA), (18.03 parts), bisphenol A (BPA), (4.1 parts), phenol (1.41 parts), and propylene glycol n-butyl ether (0.36 parts).

While stirring, the temperature is raised to 257° F. (125° C.). Subsequently, triphenylphosphine (0.04 parts) is added and the exotherm is recorded as 392° F. (200° C.). The mixture is then allowed to cool to 275° F. (135° C.), and a weight per epoxide (WPE) determination (target=525+/−25) is conducted after 45 minutes and is 544. After cooling to 194° F. (90° C.) and turning off the heating mantle, 1.73 parts of diethanolamine is introduced and the exotherm is recorded as 226.4° F. (108° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts), and the exotherm is recorded as 273.2° F. (134° C.). The mixture is stirred for an additional hour. A solution of DDSA (1.13 parts) in toluene (0.34 parts) is added at 212° F. (100° C.). The mixture is heated to 257° F. (125° C.) and stirred for 1.5 hours. A portion of 2.36 parts of PLURACOL® 710R (sold by BASF Corporation) is added followed by the crosslinker (a blocked isocyanate based on polymeric MDI and monofunctional alcohols) (13.6 parts). The mixture is stirred for 30 minutes at 221-230° F. (105-110° C.). Preparation A, the phosphorylated epoxy resin, (6.7 parts) is added and the mixture is stirred for an additional 15 minutes at 221-230° F. (105-110° C.).

After achieving a homogeneous mixture, the resins and crosslinker blend is added to an acid/water mixture, under constant stirring, of deionized water (34.95 parts) and formic acid (88%) (0.62 parts). After thoroughly mixing all components using a metal spatula, the solids are further reduced by addition of water (18.55 parts). A flow-additive package (2.51 parts) is added to the acid mixture.

Preparation D: Preparation of Binder Emulsion with the Carboxylated Phosphorylated Epoxy Resin The following materials are combined in a 3-L flask with an associated heating mantle: diglycidyl ether of bisphenol A (DGEBA), (18.03 parts), bisphenol A (BPA), (4.1 parts), phenol (1.41 parts), and propylene glycol n-butyl ether (0.36 parts).

While stirring, the temperature is raised to 257° F. (125° C.). Subsequently, triphenylphosphine (0.04 parts) is added and the exotherm is recorded as 392° F. (200° C.). The mixture is then allowed to cool to 275° F. (135° C.), and a weight per epoxide (WPE) determination (target=525+/−25) is conducted after 1 hour and is 524. After cooling to 194° F. (90° C.) and turning off the heating mantle, 2.36 parts of PLURACOL® 710R (sold by BASF Corporation) is added, then 1.73 parts of diethanolamine is introduced and the exotherm is recorded as 237.2° F. (114° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts), and the exotherm is recorded as 291.2° F. (144° C.). The mixture is stirred for an additional hour. A crosslinker (a blocked isocyanate based on polymeric MDI and monofunctional alcohols) (13.6 parts) is added. The mixture is stirred for 30 minutes at 221-230° F. (105-110° C.). Preparation A, the carboxylated phosphorylated epoxy resin with DDSA, (8.7 parts) is added and the mixture is stirred for an additional 15 minutes at 221-230° F. (105-110° C.).

After achieving a homogeneous mixture, the resins and crosslinker blend is added to an acid/water mixture, under constant stirring, of deionized water (34.95 parts) and formic acid (88%) (0.62 parts). After thoroughly mixing all components using a metal spatula, the solids are further reduced by addition of water (18.55 parts). A flow-additive package (2.51 parts) is added to the acid mixture.

Preparation E: Grinding Resin Having Tertiary Ammonium Groups

In accordance with EP 0 505 445 B1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an epoxy equivalent weight of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'-aminoethoxyethanol and 212 parts of N,N-dimethylaminopropylamine. After two hours, the viscosity of the resin solution is constant (5.3 dPas; 40% in SOLVENON® PM (methoxypropanol), available from BASF AG, Germany; cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% by weight strength aqueous-organic resin solution whose 10% dilution has a pH of 6.0. The resin solution is used in direct form for paste preparation.

Preparation F: Pigment Paste with Zirconium Oxide

A premix is first formed from 125 parts of water and 594 parts of the grinding resin of Preparation E. Then 7 parts of acetic acid, 9 parts of TETRONIC® 901, 8 parts of carbon black, 26 parts of zirconium oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation G: Pigment Paste with Zinc Oxide

A premix is first formed from 125 parts of water and 594 parts of the grinding resin of Preparation E. Then 7 parts of acetic acid, 9 parts of TETRONIC® 901, 8 parts of carbon black, 17 parts of zinc oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation H: Pigment Paste with Vanadium Oxide

A premix is first formed from 125 parts of water and 594 parts of the grinding resin of Preparation E. Then 7 parts of acetic acid, 9 parts of TETRONIC® 901, 8 parts of carbon black, 19 parts of vanadium oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation I: Pigment Paste with Yttrium Oxide

A premix is first formed from 125 parts of water and 594 parts of the grinding resin of Preparation E. Then 7 parts of acetic acid, 9 parts of TETRONIC® 901, 8 parts of carbon black, 23 parts of yttrium oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation J: Pigment Paste with Cobalt Oxide

A premix is first formed from 125 parts of water and 594 parts of the grinding resin of Preparation E. Then 7 parts of acetic acid, 9 parts of TETRONIC® 901, 8 parts of carbon black, 17 parts of cobalt oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation K: Pigment Paste with Double Cobalt Oxide

A premix is first formed from 125 parts of water and 594 parts of the grinding resin of Preparation E. Then 7 parts of acetic acid, 9 parts of TETRONIC® 901, 8 parts of carbon black, 34 parts of cobalt oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Preparation L: Pigment Paste with Molybdenum Oxide

A premix is first formed from 125 parts of water and 594 parts of the grinding resin of Preparation E. Then 7 parts of acetic acid, 9 parts of TETRONIC® 901, 8 parts of carbon black, 26 parts of molybdenum oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Preparation M: Pigment Paste

A premix is first formed from 125 parts of water and 594 parts of the grinding resin of Preparation E. Then 7 parts of acetic acid, 9 parts of TETRONIC® 901, 8 parts of carbon black, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co., Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 69.43% by weight (1 hour at 110° C.).

Example 1

An electrocoat bath is prepared by combining 1211.7 parts Preparation C, 150.8 parts Preparation M, and 1137.5 parts deionized water. The water and Preparation C resin emulsion are combined in a container with constant stirring, and Preparation M is added with stirring. The bath solid contents are 19% by weight.

Example 2

An electrocoat bath is prepared by combining 1211.7 parts Preparation C, 148 parts Preparation J, and 1140.5 parts deionized water. The water and Preparation C resin emulsion are combined in a container with constant stirring, and Preparation J is added with stirring. The bath solid contents are 19% by weight.

Example 3

An electrocoat bath is prepared by combining 1164 parts Preparation C, 139.8 parts Preparation K, and 1095.8 parts deionized water. The water and Preparation C resin emulsion are combined in a container with constant stirring, and Preparation K is added with stirring. The bath solid contents are 19% by weight.

Example 4

An electrocoat bath is prepared by combining 1211.7 parts Preparation C, 143.8 parts Preparation L, and 1144.5 parts deionized water. The water and Preparation C resin emulsion are combined in a container with constant stirring, and Preparation L is added with stirring. The bath solid contents are 19% by weight.

Example 5

An electrocoat bath is prepared by combining 1662 parts Preparation D, 146 parts Preparation M, and 692 parts deionized water. The water and Preparation D resin emulsion are combined in a container with constant stirring, and Preparation M is added with stirring. The bath solid contents are 19% by weight.

Example 6

An electrocoat bath is prepared by combining 1211.7 parts Preparation D, 143.8 parts Preparation F and 1144.5 parts deionized water. The water and Preparation D resin emulsion are combined in a container with constant stirring, and Preparation F is added with stirring. The bath solid contents are 19% by weight.

Examples 1-6 (1 is a comparative example, 2-6 are examples of the invention) are tested by coating both phosphated and bare cold rolled steel 4-inch-by-6-inch test panels at 100 to 225 volts (0.5 ampere) in the Example being tested at bath temperatures from 88-98° F. (31-36.7° C.) for 2.2 minutes and baking the coated panels for 28 minutes at 350° F. (177° C.). The deposited, baked coating has a filmbuild of about 0.8 mil (20 μm). Three panels were coated for each temperature and substrate.

Control panels were prepared as described above but using U32AD500 (commercial product sold by BASF Corporation).

After baking, each panel is scribed directly down the middle and tested in accordance with GMW14872. The test description is as follows: For 8 hours the test panels are subjected to contaminant spray of salt solution consists of 0.5% NaCl, 0.1% $CaCl_2$ and 0.075% $NaHCO_3$ at 25° C. and 45% relative humidity (RH). Next the test panels are subjected to 49° C. and a RH of 100% for 8 hours, followed by a dry stage where panels are subjected to 60° C. at <30% RH for 8 hours. The cycle is repeated until cold rolled steel (CRS) (per SAEJ2329 CRIE, uncoated) coupons reach 3.9 gm weight loss. After completion, each panel is rinsed with water and scraped with a metal spatula. The corrosion is measured as the average of scribe width of selected points along the scribe length.

Results are as tested on bare cold rolled steel

| | GMW14872 avg mm Scribe width |
|---|---|
| Example 1 | 7.8 |
| Example 2 | 8.6 |
| Example 3 | 7.1 |

-continued

| | GMW14872 avg mm Scribe width |
|---|---|
| Example 4 | 7.7 |
| Example 5 | 7.2 |
| Example 6 | 7.3 |
| Control | 12.3 |

Example 7

An electrocoat bath is prepared by combining 1211.7 parts Preparation D, 143.8 parts Preparation G and 1144.5 parts deionized water. The water and Preparation D resin emulsion are combined in a container with constant stirring, and Preparation G is added with stirring. The bath solid contents are 19% by weight.

Example 8

An electrocoat bath is prepared by combining 1211.7 parts Preparation D, 143.8 parts Preparation H and 1144.5 parts deionized water. The water and Preparation D resin emulsion are combined in a container with constant stirring, and Preparation H is added with stirring. The bath solid contents are 19% by weight.

Example 9

An electrocoat bath is prepared by combining 1211.7 parts Preparation D, 143.8 parts Preparation I and 1144.5 parts deionized water. The water and Preparation D resin emulsion are combined in a container with constant stirring, and Preparation I is added with stirring. The bath solid contents are 19% by weight.

Coated panels are prepared from Examples 7-9 by coating both phosphated and bare cold rolled steel 4-inch-by-6-inch test panels at 100 to 225 volts (0.5 ampere) in each one of Examples 7-9 at bath temperatures from 88-98° F. (31-36.7° C.) for 2.2 minutes and baking the coated panels for 28 minutes at 350° F. (177° C.). The deposited, baked coatings have a filmbuild of about 0.8 mil (20 μm).

The description is merely exemplary in nature and, thus, variations that do not depart from the gist of the disclosure are a part of the invention. Variations are not to be regarded as a departure from the spirit and scope of the disclosure.

What is claimed is:

1. An aqueous coating composition comprising
a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements and combinations thereof and an electrodepositable binder, the binder comprising resin or resins comprising: (a) a phosphorous-containing group

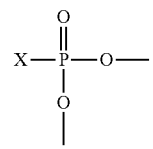

in which X is a hydrogen, a monovalent hydrocarbon, or an oxygen atom having a single covalent bond to the phosphorous atom, and each oxygen atom has a covalent bond to a hydrogen atom, an alkyl group, an aryl group, an alkylaryl group, an arylalkyl group, or the resin or one of the resins, with the caveat that at least one oxygen atom has a covalent bond to the resin or one of the resins; (b) a carboxylate group separated by from 2 to 4 carbons from an ester group; and (c) a tridentate amine ligand.

2. An aqueous coating composition according to claim 1, wherein the resin or one of the resins is an epoxy resin.

3. An aqueous coating composition according to claim 1, wherein the resin comprises or the resins comprise as phosphorous-containing group a monophosphate ester group, a monophosphonic acid ester group, or both.

4. An aqueous coating composition according to claim 1, wherein the resin comprises or the resins comprise as phosphorous-containing group a monophosphate ester group, a monophosphonic acid ester group, or both.

5. An aqueous coating composition according to claim 1, wherein the resin comprises or the resins comprise as phosphorous-containing group a triphosphate ester group.

6. An aqueous coating composition according to claim 1, wherein the metal oxide is selected from the group consisting of bismuth oxide, vanadium oxide, manganese oxide, cobalt oxide, zinc oxide, yttrium oxide, molybdenum oxide, zirconium oxide, and combinations thereof.

7. An aqueous coating composition according to claim 1, comprising from about 0.01 to about 1 percent by weight of the metal oxide based on total binder solids weight.

8. An aqueous coating composition according to claim 1, wherein the binder comprises an electrodepositable resin free of the phosphorous-containing group, the carboxylate group separated by from 2 to 4 carbons from an ester group, and the tridentate amine ligand.

9. An aqueous coating composition according to claim 1, wherein the the resin or one of the resins is a vinyl resin.

10. An aqueous coating composition according to claim 1, wherein the carboxyl group separated by from 2 to 4 carbons from an ester group is the reaction product of a cyclic anhydride with a hydroxyl group.

11. An aqueous coating composition according to claim 1, wherein the tridentate amine ligand has a structure —N(—R'—NR$_2$)$_2$, in which R' is an alkyl group having from one up to four carbon atoms and optionally having an ether oxygen and each R is independently an alkyl of 1 to 4 carbon atoms.

12. An aqueous coating composition according to claim 11, wherein R' is an ethylene or propylene group and each R is a methyl group.

13. An aqueous coating composition according to claim 1, wherein the resin or one of the resins is a tridentate amine ligand-containing resin comprising a further amine group other than the tridentate amine ligand.

14. A method of coating a metal automotive vehicle body, comprising:
(a) cleaning the metal automotive vehicle body;
(b) placing the cleaned metal automotive vehicle body into an aqueous coating composition according to claim 1;

(c) connecting the metal automotive vehicle body as an electrode in an electric circuit and passing a current through the aqueous electrodeposition coating composition to deposit an electrocoat coating layer onto the metal automotive vehicle body.

15. A method of coating a metal automotive vehicle body according to claim 14, wherein the metal automotive vehicle body is free of a phosphate pre-treatment.

16. A method of coating a metal automotive vehicle body according to claim 14, wherein the binder comprises an epoxy resin comprising a member selected from the group consisting of the phosphorous-containing group, the carboxylate group separated by from 2 to 4 carbons from an ester group, the tridentate amine ligand, and combinations thereof.

17. A method of coating a metal automotive vehicle body according to claim 14, wherein the metal oxide is selected from the group consisting of bismuth oxide, vanadium oxide, manganese oxide, cobalt oxide, zinc oxide, yttrium oxide, molybdenum oxide, zirconium oxide, and combinations thereof.

18. A method of coating a metal automotive vehicle body according to claim 14, wherein the aqueous coating composition comprises from about 0.01 to about 1 percent by weight of the metal oxide based on total binder solids weight.

19. A method of coating a metal automotive vehicle body according to claim 14, further comprising
(d) applying a further coating layer over the electrocoat coating layer.

20. A method according to claim 19, wherein the further coating layer is a primer coating layer.

21. A method according to claim 20, further comprising:
(e) applying a topcoat layer over the primer coating layer.

22. A method according to claim 21, wherein the topcoat layer comprises a basecoat/clearcoat composite coating.

23. A method according to claim 21, wherein the primer layer is cured before applying the topcoat layer.

24. A method according to claim 21, wherein the primer layer and the topcoat layer are cured together.

25. A method according to claim 21, wherein the electrocoat coating layer, the primer layer, and the topcoat layer are cured together.

26. A method according to claim 19, wherein the further coating layer is a topcoat coating layer.

27. A method according to claim 19, wherein the electrocoat coating layer is cured before step (d).

28. A method according to claim 19, wherein the electrocoat coating layer and the further coating layer are cured together after step (d).

29. A method according to claim 19, wherein the metal automotive vehicle body is free of a phosphate pre-treatment.

* * * * *